United States Patent [19]

Holland et al.

[11] Patent Number: 4,477,012

[45] Date of Patent: Oct. 16, 1984

[54] FOIL INSERT HONEYCOMB SANDWICH BRAZING PROCESS AND RESULTING STRUCTURE

[75] Inventors: Charles L. Holland, Escondido; Dale L. Jennings, San Diego, both of Calif.

[73] Assignee: Rohr Industries, Inc., Chula Vista, Calif.

[21] Appl. No.: 449,149

[22] Filed: Dec. 13, 1982

[51] Int. Cl.³ .............................................. B23K 31/00
[52] U.S. Cl. .................................... 228/181; 228/246; 228/258
[58] Field of Search .............. 228/181, 185, 189, 204, 228/245, 246, 249, 252, 258, 263.13

[56] References Cited

U.S. PATENT DOCUMENTS 2,174,218  9/1939  Greene ............................... 228/246
4,314,661  2/1982  DeCristofaro .................. 228/263.15

FOREIGN PATENT DOCUMENTS 2412862  10/1975  Fed. Rep. of Germany ...... 228/249
216096  11/1941  Switzerland ....................... 228/249
513749  10/1939  United Kingdom ................ 228/249

Primary Examiner—Kenneth J. Ramsey
Assistant Examiner—Marc Hodak
Attorney, Agent, or Firm—Patrick J. Schlesinger; Frank D. Gilliam

[57] ABSTRACT

A method of brazing the nodes of honeycomb core material and the top and bottom panels to the honeycomb core material to form a sandwich structure. The method comprises the insertion in selected cells of the core, a coil or loop formed of normally flat resilient braze foil ribbon under tension and then releasing the tension to allow the braze foil, coil or loop to be urged against the cell walls under its own resiliency. The top and bottom panels are then installed over the core adjacent to the cell faying edges to form top and bottom surfaces. Pressure is then applied from the panels toward the honeycomb core material. The temperature of the sandwich structure is then elevated until the braze foil is caused to melt. Capillary attraction causes the now liquid braze material to flow into the interstices between the cell nodes and between the faying edges of the honeycomb core cells and the adjacent panels.

8 Claims, 3 Drawing Figures

FOIL INSERT HONEYCOMB SANDWICH BRAZING PROCESS AND RESULTING STRUCTURE

BACKGROUND OF THE INVENTION

This invention relates generally to an improvement in brazing methods and more particularly, but not by way of limitation, to an improved method of bracing metallic honeycomb sandwich structures.

Brazing of the structural elements of metallic sandwich structures, such as the cell nodes of honeycomb cores and cores to top and bottom or end panels may be carried out by a number of methods. Such methods include coating the cell walls and/or end panels with a brazing powder suspended in a binder, or placing thin sheets of brazing material between the core and the facing or end panels, or placing braze material at the core cell nodes or plating the core material and/or the facing or end panels with a suitable braze alloy. After one of the above methods of depositing braze materials is complete, the honeycomb core structure is sandwiched between the end panels in the form of a sandwich structure. The braze alloy may also be placed in the core by means of braze foil segments which are spot welded between the core nodes and which may bisect the cells of the core. Downwardly directed pressure and heat are then applied to the sandwich structure causing the braze material to melt and by capillary attraction flow to the cell nodes and the cell edge adjacent the end panels. When the sandwich structure is cooled an integral sandwich structure is formed.

Prior art braze bonding utilizing the above and other similar methods of braze bonding can be found in the following U.S. Pat. No. 3,030,703; No. 3,057,057; No. 3,068,565; No. 3,106,015; No. 3,656,224; and No. 4,333,598.

Such prior art braze bonding methods as have been heretofore described are capable of manufacturing generally acceptable sandwich structures. However, all such methods in some way or another are deficient in some respects and do not provide a braze bonding method that is truly efficient and economical and which provide a superior product.

For example, the method involving use of the braze powder requires application of an excess of braze material in order to ensure application of a requisite amount since uniform application is not possible. Application of additional braze material results in increased weight of the brazed panel and excessive use of an expensive braze material. In the heating phase of the braze process the acrylic binder bakes off and tends to contaminate the vacuum oven chamber and the associated diffusion pumps. Then if the oven and the pumps are not frequently cleaned the outgassing of the deposited binder on the contaminated interior of the oven and the pumps tends to oxidize and degrade the quality of the braze being made on further sandwich structure.

The powdered braze material is applied to the core by equipment that is subject to misalignment and miscalibration thereby resulting in unacceptable brazes. After the powdered braze material has been sprayed into the core the faying edges of the core must then be hand sanded to clean such edges of the braze powder and the sanded particles must also be removed in order to ensure an intimate fit between the faying edges of the core and the facing panels as required for capillary action and efficient distribution of the liquid braze material. It is evident that such operations are inefficient and time consuming.

The brazing method which involved the placing of braze sheets between the core and the face sheets is also deficient in that an excess of braze material is involved and the braze itself is also unacceptable. This is caused because the braze sheet melts before the pressure against the face sheets can increase to compensate for the gap left by the braze sheet going into a liquid state. Thus, a gap is encountered between the faying edges of the core and the face sheets and the braze material will not be drawn by capillary action into such gaps thereby resulting in an unacceptable weld.

The method using the braze foil segments spot welded into the nodes of the core is also inefficient since the braze material is part of the joint connecting the nodes of the core. Since this braze material is weaker than the material of the core, these joints at the core nodes tend to crack and break when the core is formed into a cylinder or other curved shape prior to being positioned between two mating face sheets to be brazed together. If these nodes separate the braze material will not bridge such gaps by capillary action in the brazing process and the resultant structure will be weak in those areas where the core joints had cracked. Also, when the braze material is provided by such braze foil segments secured to the core nodes, the foil segments tend to melt at one side of the foil segment bisecting the cell and the remaining portion of the foil tends to melt into the joint away from the end that initially melted and the resulting braze panel is not uniform in strength. If the foil segments are pre-clipped in a labor intensive step, the foil segment held within the node melts before the remaining portion of the foil segment with the remaining portion falling downwardly to the cell floor and resulting in an excess of the braze material on the melted area of one face sheet as opposed to the other face sheet. It is believed that such difficulties as have been described are obviated by the present novel method.

SUMMARY OF THE INVENTION

The present invention is directed to an improved method of braze bonding honeycomb core cells to each other at their nodes and the top and bottom panels to the honeycomb core to form metallic honeycomb sandwich panels as is well known in the aircraft manufacturing art.

The present invention provides a unique method of braze bonding the adjacent core cells together at their nodes and the core cells to facing or end panels. This invention takes advantage of the natural resilient characteristics of braze bond foil. Conventional braze bond foil is resilient or "springy" in nature due to the alloys commonly used. Typical braze bonding foil is formed in flat ribbons. Formed flat, these ribbons resist taking on another form, such as for example, a loop or coil. Where strips of braze bonding foil are formed in a loop or coil and then released they "spring" back to their original flat form.

The method of the invention is accomplished by taking small strips of braze bonding foil and forming them into open coils or loops having either a singular layer or multi-layers wrapped about itself and inserting one of these coils or loops into a selected cell of honeycomb material and releasing the forming tension from the coil or loop. The coil or loop instantly attempts to spring back to its flat configuration. The inherent resilience of the braze bonding foil urges the foil into contact with the cell walls. Typically, alternate cells will receive the braze bonding foil. The number of cells to receive the bonding foil will be determined by the thickness of the foil and the dimensions of the foil compared with the dimensions of the cell walls.

After the foil is inserted in the selected cells, the top and bottom panels are positioned over the faying edges of the core cells, pressure is applied from the panels toward the core and the temperature of the structure is elevated causing the braze bonding foil to melt and due to capillary attraction, flow along the cell wall contacting points into the interstices between adjacent cell walls and between the edges of the cells of the honeycomb core and adjacent end panel surfaces.

An object of this invention is to provide an improved method of simultaneously bonding together the adjacent cell walls to form core material and bonding the cell faying edges to top and bottom panels.

Another object of the invention is to provide a braze bonding method for assembling honeycomb sandwich structures that requires a minimum of braze bonding material thereby reducing economic cost and gross structure weight.

Other objects and advantages of the invention will become apparent during the course of the following description of the accompanying drawings, wherein:

DETAILED DESCRIPTION OF THE DRAWINGS

Figure 1:
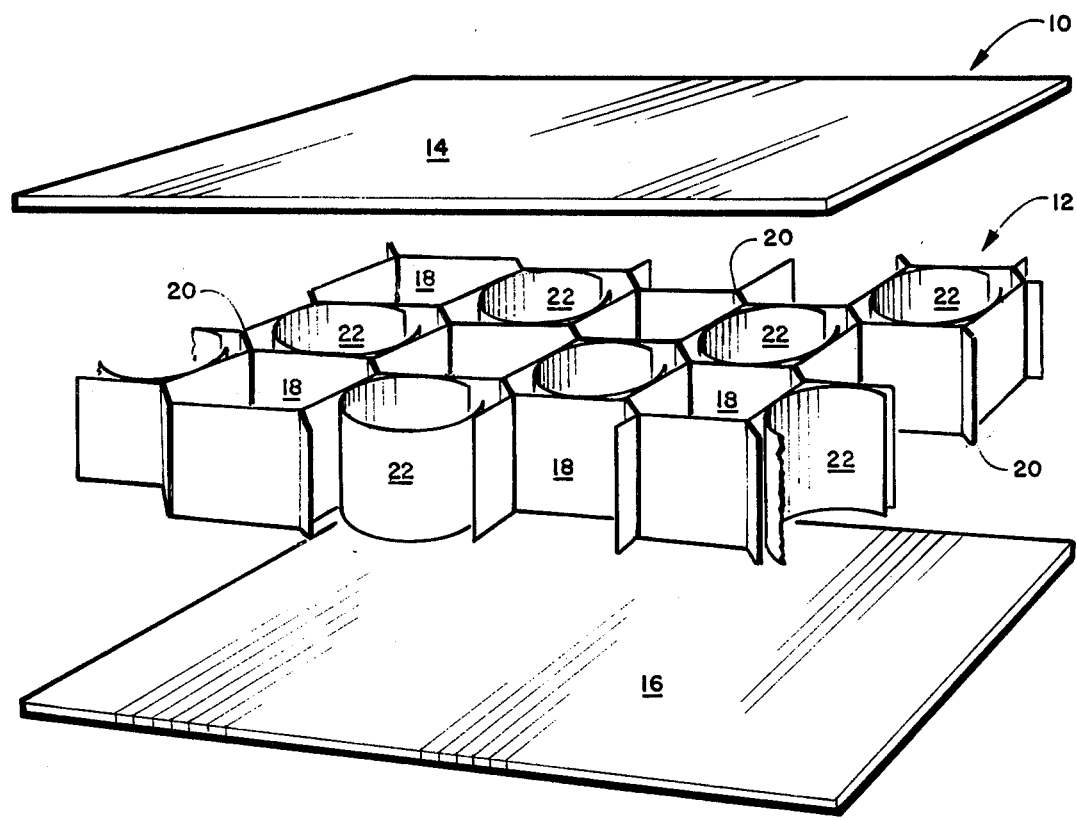
FIG. 1 depicts an exploded view of a sandwich structure having a central honecomb core and top and bottom panels.

Referring now specifically to the drawing FIG. 1 shows an exploded view of the components employed to manufacture a honeycomb core sandwich panel 10. The sandwich panel comprises a central honeycomb core 12 and top and bottom closure panels 14 and 16 respectively.

The central core 12 is comprised of a plurality of cells 18 which may take many different shapes well known in the art. Typically, they will be four or six sided.

Although honeycomb cores are constructed by various different methods, typically they are formed from corrugated strips of metal that can be braze bonded. The corrugated strips of metal are then positioned together and seam welded at their nodes 20 to form a temporary integral core structure.

The present invention utilizes a temporary integral core structure of this type. It should be understood, however, that the method of the present invention could employ any type of honeycomb core structure that employs braze bonding either at the point of joinder of the strips of metal forming the core cell or at the faying edges of the cells and the top and bottom panel joinder or both.

Figure 2:
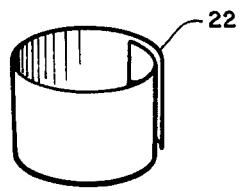
FIG. 2 is a plan view of an open coil or loop of braze bonding ribbon.

Referring now more particularly to FIGS. 1 and 2, strips of flat formed resilient braze bonding foil are cut and formed into coils or loops 22. The typical alloys utilized in conventional braze bonding foil are inherently resilient or springy and resist cold forming into forms other than their original flat form. The braze bond foil 22 may be one of a number of the amorphous BNi series of any comparatively ductile metallic glass or amphous type of braze alloy materials. These BNi series alloys may contain substantial amounts of boron and/or phosphate and/or silicon and/or iron and/or chromium as melt point depressants. A typical braze bond foil that has been advantageously used successfully in the practice of this invention, is Metglas ® braze alloy developed by Allied Chemical Company. Care should be taken not to crease the coils or loops along their surface as this tends to reduce their memory to return to their original form. The size of the strip so formed is determined by the cell size into which the coil or loop will be inserted. The width of the braze bonding foil depends on the thickness of the foil and whether or not both the cell nodes and the top and bottom panels are to be adhered. When only the top and bottom panels are to be adhered (the core cells having been permanently attached) less braze foil is required and consequently either small width foil is used or thinner foil is used. The ratio between width and thickness depends on the surface that must be adhered.

When the coils or loop 22 are formed, the loops 22 because of their inherent resilient/springy nature, must be held in tension until inserted into the selected cells. The number of cells to contain the coils or loops of braze foil required to perform the task of joining the width and thickness of the braze bonding foil is predetermined. It has been found that when the nodes 20 of the cells are to be joined as well as the panels adhered to the core, braze bonding foil strips of a width substantially equal to the cell height and a thickness of from 1 to 2.5 mills need only be inserted in alternate cells as shown. In a typical example a core with four sided cells of approximately ⅜ inch on a side and from ¾ to 1 inch in height, braze bond material ¾ of an inch in height. 0.002 inches thick and of a sufficient length to form a single open loop as shown in FIG. 1, and placed in alternate cells successfully bonded the cell nodes and facing panels to the core. It should be understood that any number of cells may be selected to receive braze bonding foil coils or loops depending on the manufacturing circumstances.

As each coil or loop 22 is inserted into a cell and released from tension, the coil or loop springs open due to the braze foil resiliency making contact with the cell wall at various locations around the coil or loop. The resiliency of the braze foil is such that the coil or loop will be urged against the cell wall surface with sufficient force to make positive physical contact therewith.

Figure 3:
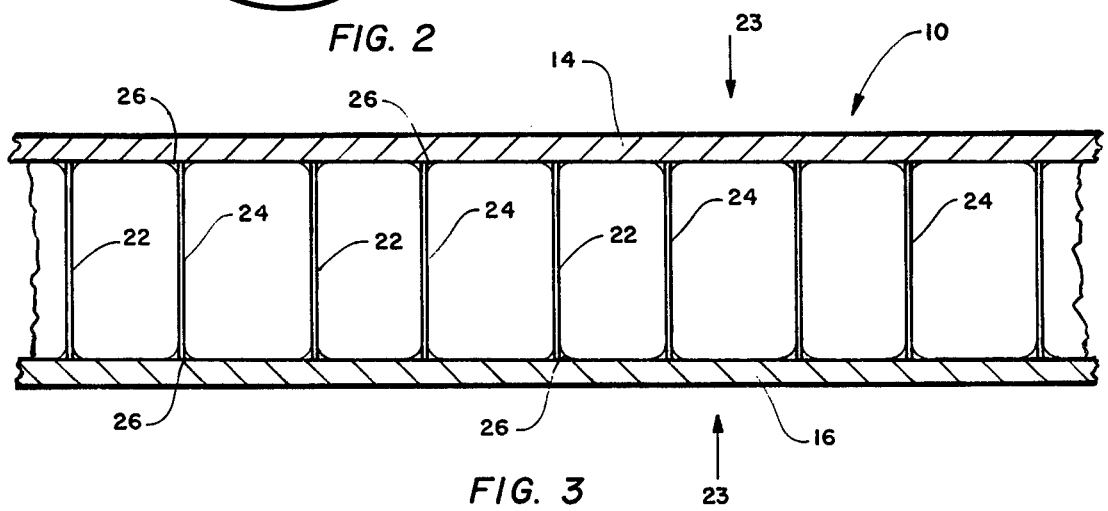
FIG. 3 depicts a cutaway end view of the FIG. 1 showing of the assembled structure.

When the selected cells 18 contain braze bonding foil, the top and bottom panels 14 and 16 respectively are positioned over the faying edges of the cells of the core 12 an intimate contact to form a sandwich structure 10 as shown in FIG. 3.

Pressure is then applied in the direction of arrows 23 by conventional and well known means, such as weight, by way of example. This pressure is typically 0.3 pounds per square inch. With pressure applied, the structure 10 is placed in a furnace and its temperature is elevated until the braze foil material 22 is caused to melt. When the braze material becomes liquidous it flows along the cell walls into the interstices 24 between the cell node walls and along the faying edges of the honeycomb cells making contact with the adjacent top and bottom panel surface 26 by capillary attraction.

The structure is then cooled to ambient temperature. The cooled sandwich panel is now a solid integral structure.

It should be understood that although only open coils or loops 22 are shown, the coils or loops could be formed of multi-layers of braze bond foil, that is, the foil could be wrapped about itself a selected number of layers. This multi-wrapping of the braze foil provides increased braze material as required.

Although both top and bottom panels 14 and 16 are shown as imperforate, it should be understood that perforate panels could be braze bonded to the core with equal success. When a perforate panel was braze bonded in this manner the edge of the perforations that were in contact with or immediately adjacent to the faying edges of the cells received braze material and the perforation remained open.

This invention may be embodied in other forms or carried out in other ways without departing from the spirit or essential characteristics thereof. The present embodiment of the invention is therefore to be considered in all respects to be illustrative and not restrictive, the scope of the invention being indicated by the appended claims, and all changes which come within the meaning and range of equivalency of the claims are intended to be embraced therein.

What is claimed is:

1. A method of brazing together the interstices between the cell nodes of honeycomb core material and the interstices between the cell edges of the honeycomb core and the surface of adjacent panels comprising:
   (a) inserting into selected cells, sections of normally flat resilient braze foil material formed and held in tension in a loop configuration;
   (b) releasing said tension whereby said braze foil returning to its original flat configuration is urged in contact with the cell walls;
   (c) placing said honeycomb core material between panels forming a sandwich structure thereby; and
   (d) elevating the temperature of said sandwich structure causing said braze foil material to melt and flow along the cell walls into said cell nodes and interstices by capillary attraction.

2. The method of claim 1 wherein the additional step of applying pressure from said panels toward the honeycomb core occurs between steps (c) and (d).

3. The method of claim 2 wherein step (a) the open loop of resilient braze foil is in the form of a cylinder.

4. The method of claim 2 wherein said resilient braze foil is constructed of BNi alloy.

5. The method of claim 1 wherein step (a) comprises inserting the formed braze foil material into alternate cells.

6. The method of claim 1 wherein step (a) the open loop of resilient braze foil is in the form of a cylinder.

7. The method of claim 1 wherein said resilient braze foil is constructed of a BNi alloy.

8. A method of brazing together the interstices between cell nodes of honeycomb core material and the interstices between the cell edges of the honeycomb core and the surface of adjacent panels comprising:
   (a) placing honeycomb core material having selected cells which contain annular sections of resilient braze foil material that are urged into contact with the cell walls, such core material being positioned between top and bottom panels to form a sandwich structure thereby; and
   (b) elevating the temperature of said sandwich structure to cause said braze foil material to melt and flow along the cell walls into said cell nodes and interstices by capillary attraction.

* * * * *